United States Patent [19]
Darras

[11] Patent Number: 6,020,057
[45] Date of Patent: *Feb. 1, 2000

[54] CUT AND PUNCTURE RESISTANT SURGICAL GLOVE

[76] Inventor: Robert Darras, 43780 Kulebra La., Bermuda Dunes, Calif. 92201

[*] Notice: This patent is subject to a terminal disclaimer.

[21] Appl. No.: 09/154,598

[22] Filed: Sep. 24, 1998

Related U.S. Application Data

[63] Continuation of application No. 08/784,784, Jan. 16, 1997, Pat. No. 5,817,433.

[51] Int. Cl.[7] .................................................. A41D 19/00
[52] U.S. Cl. ........................... 428/323; 2/161.7; 428/328; 428/408; 428/911
[58] Field of Search .................................... 428/323, 328, 428/408, 911; 2/161.7

[56] References Cited

U.S. PATENT DOCUMENTS

| | | | |
|---|---|---|---|
| 3,761,965 | 10/1973 | Barasch | 2/167 |
| 4,038,787 | 8/1977 | Bianchi | 2/167 |
| 4,779,290 | 10/1988 | Welch et al. | 2/167 |
| 5,200,263 | 4/1993 | Gould et al. | 428/323 |
| 5,336,555 | 8/1994 | Darras et al. | 428/408 |
| 5,679,399 | 10/1997 | Shlenker et al. | 427/407.1 |
| 5,817,433 | 10/1998 | Darras | 428/911 |

Primary Examiner—Nasser Ahmad
Attorney, Agent, or Firm—Price, Gess & Ubell

[57] ABSTRACT

A surgical glove and method for making same is disclosed comprised of a polymeric matrix with at least one compact layer of very small particulate characterized by a very high hardness disposed therein. The disclosed glove and method is cost effective, easily adapted to present manufacturing methods, and provides a surgical glove which demonstrates a high resistance to cuts and punctures while maintaining a high level of elasticity and touch. The proposed particulate is one of a series of powders such as silicon carbide, carborundum, or diamond dust having a mean particle size of between 1–85 microns and a preferred particle size of between 5–8 microns, which can be applied to a curing elastic glove via spray or pre-mixing the particulate in the molten polymeric matrix prior to forming. The estimated thickness of the finished glove is approximately 2–7 millimeters, although greater thicknesses can be achieved by repeated processing at a cost of superior tactility but without loss of elasticity. More protection can be achieved by generating multiple layers of particulate sandwiched between layers of the polymer matrix.

11 Claims, 1 Drawing Sheet

CUT AND PUNCTURE RESISTANT SURGICAL GLOVE

This application is a continuation of U.S. Ser. No. 08/784,784, filed on Jan. 16, 1997, now U.S. Pat. No. 5,817,433 for CUT AND PUNCTURE RESISTANT SURGICAL GLOVE.

BACKGROUND OF THE INVENTION

1. Field of the Invention

The present invention relates to medical apparel, and in particular to a reinforced cut and puncture resistant surgical glove having hard particulate matter dispersed in a polymeric matrix to produce a flexible surgical glove having improved cut and puncture resistant properties.

2. Description of the Related Art

Medical and dental personnel come in contact with a number of substances which pose a personal risk and which surgical gloves are relied upon to protect these individuals from harm. Blood carrying viruses, toxins, hepatitis, acquired immune deficiency syndrome, and a plethora of other risks face medical practitioners every day. Common latex gloves, which are impervious to the solutions and solvents carrying these dangers are sufficient to protect the doctors and nurses who wear them and provide the maneuverability and tactile response which is often times necessary for skilled operations requiring the utmost in control and precision. However, the latex gloves provide the necessary tactile response at the expense of structural integrity. The thin gloves are cut or pricked by needles or scalpels, the consequences of which could be catastrophic to the user of the gloves. Infections and contamination caused by surgical gloves which have been cut or impregnated by a medical instrument causing blood or other fluid to be transferred from a patient to the care giver have always been a major concern of medical personnel, and the rise of the AIDS epidemic has further heightened the awareness of these dangers. It is clear that there is a need in the art for a puncture and cut resistant surgical glove which can protect individuals from dangerous substances.

In response, the manufacturers of surgical gloves have attempted to provide a more durable glove which retains the ductility and responsiveness of the latex glove. Thicker gloves made of urethane have been tried, but the thicker gloves do not provide the touch necessary for delicate surgeries such as cardiovascular or neurosurgery. Other attempts have included attaching a mesh of fine metal to the glove, such as that of Welch, U.S. Pat. No. 4,779,290. Welch teaches an armor applied to a glove during the curing of the rubber glove on the dorsal side of the glove to protect the hand from cuts. The Welch glove is susceptible to needle pricks and the armor mesh adds weight to the glove while reducing the ductility. Other methods include a multi-layer surgical glove with pillars interspersed between the layers at critical areas where cuts and punctures are probable, such as that of Pierce, U.S. Pat. No. 5,317,759, and providing a glove with an inner layer of comprising a protective overlay such as that of Seid, U.S. Pat. No. 4,742,578. Each of these methods are improvements over the mere latex glove as far as protection is concerned, but cost and maneuverability is sacrificed in the process.

Another approach has been to imbed certain particles into the glove to strengthen the glove while retaining the tactile response of the latex glove. Barasch, U.S. Pat. No. 3,761,965 teaches the addition of granular vinyl chloride polymer to a curing glove to provide a randomly distributed textured area on the glove's inner surface. Gould, U.S. Pat. No. 5,200,263, and Samples, U.S. Pat. No. 5,368,930 each teach a material suitable for surgical gloves which includes platelets in the composite which are arranged so as to overlap and provide a protective layer within the surgical glove. The use of platelets requires additional processing to ensure that the platelets properly overlap in the desired arrangement, thereby complicating the manufacturing process. In another approach, whiskers of a sufficiently hard material have been introduced into the polymeric matrix which makes up the glove, as taught by myself in U.S. Pat. No. 5,336,555. However, the art is still striving to find an easily produced optimally reinforced surgical glove with the greatest ductile responsiveness and superior strength and resistance to cuts and punctures, especially one which requires very little change in the method of production thereby keeping costs down.

SUMMARY OF THE INVENTION

In accordance with the present invention, a surgical glove is disclosed having a very small particulate characterized by a very high hardness dispersed in a concentrated layer of a polymeric matrix. The disclosed glove and method for making same is cost effective and provides a surgical glove which demonstrates a high resistance to cuts and punctures while maintaining a high level of elasticity and touch. The proposed particulate is one of a series of powders such as silicon carbide or diamond dust having a mean particle size of between 1–85 microns, but preferably between 5–8 microns, which can be applied to a curing plastic glove via spray or pre-mixing the particulate in the molten polymeric matrix prior to forming. The estimated thickness of the finished glove is approximately 2–7 millimeters, while the layer of particulate matter is typically about 0.3 millimeters in thickness.

BRIEF DESCRIPTION OF THE DRAWINGS

For a better understanding of the present invention, reference is made to the following description of the exemplary embodiments considered in conjunction with the accompanying drawings, in which.

DESCRIPTION OF THE EXEMPLARY EMBODIMENTS

The following description is provided to enable any person skilled in the art to make and use the invention and sets forth the best modes contemplated by the inventor of carrying out his invention. Various modifications, however, will remain readily apparent to those skilled in the art, since the general principles of the present invention have been defined herein specifically to provide an economical surgical glove with improved cut and puncture resistance while maintaining tactile response and elasticity.

Figure 1:
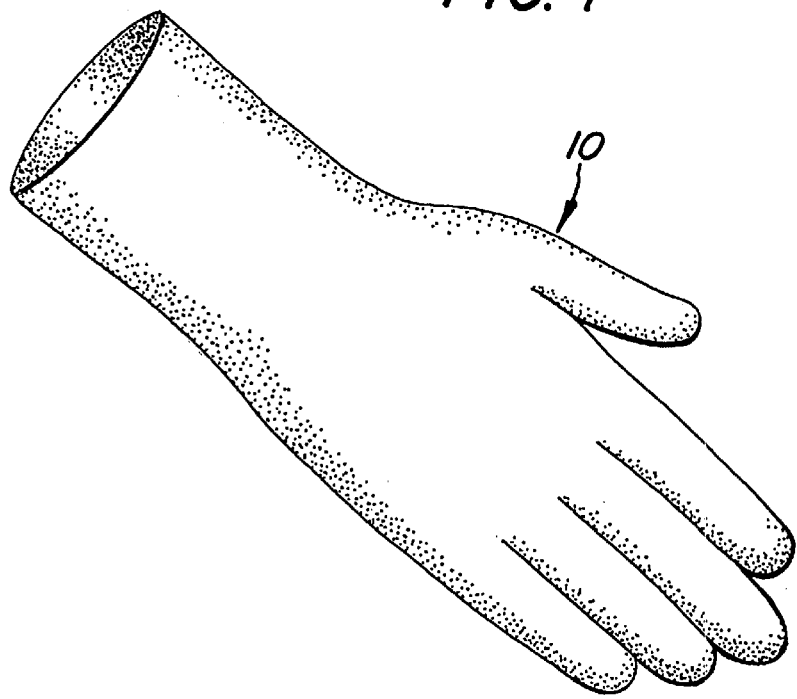
FIG. 1 is a perspective view of a surgical glove indicative of the present invention.

FIG. 1 is illustrative of a surgical glove 10 of the present invention such as might be used by a dentist, surgeon, nurse, doctor, paramedic, or other medical caregiver. The glove 10 is shaped in the normal manner, usually by dipping a hand shaped form or mandrel into a vat of liquid polymeric matrix such as, but not limited to, latex or rubber. (Note that the dots on the figure is for shading purposes and should not be interpreted to show particulate matter exposed to the outer surface of the glove.) Upon withdrawal from the vat and while still moist and tacky, the glove 10 is subjected to a spray or mist of particulate matter of a type to be described below. As the glove 10 dries, the particulate matter is incorporated into the matrix to form a layer of the two elements. After drying, the mandrel is redipped into the vat of polymeric matrix to form a second layer of polymeric matrix sandwiching the layer of particulate matter. Alternately, the particulate matter can be mixed into a second vat of polymeric matrix and the glove prepared by first dipping the mandrel into the matrix-only vat, and then dipping the mandrel into the matrix-plus-particulate vat, and finally redipping the mandrel into the matrix-only vat again. In both cases the procedure may be repeated as many times as desired to achieve a glove with the specific thickness and desired number of protective layers for the designated application. When fully cured, the surgical glove is suitably tactile and elastic but retains greatly improved resistance to cuts and penetration from sharp instruments such as sutures and scalpels.

Of vital importance is the selection of a suitable particulate matter which possesses the necessary hardness to effectuate the invention while yielding a glove having sufficient elasticity and tactility. Particulate candidates should have a value of at least 9 on the Mohs scale (10 being diamond) to create the barrier against acute instruments. The elements which have been found to work best are Carborundum and diamond dust with respective Mohs scale values of 9 and 10. Using a powder rather than platelets has two advantages, the ductility is not hampered by "sheets" of platelets which resist bending and flexing, and no predetermined arrangement of the particulate is necessary. This is an advantage over the art which requires that platelets be arranged such that they are parallel to each other, a difficult achievement of practical significance. No solid integrated system is needed, but rather the present invention relies on the hardness, compactness, and layering of the particulate matter to resist cuts.

The manufacture of the surgical glove 10 of the present invention can readily be adapted to present manufacturing with minimal changes in production lines. A solution is prepared comprising latex, rubber or other elastomers and the solution is heated to an inviscid liquid. A mandrel shaped like a human hand is dipped into the liquid and removed forming a thin layer of the solution on the mandrel. As the solution begins to cure, it becomes tacky as the liquid solidifies. Particles are then sprayed or blown onto the mandrel in a fine mist to coat the mandrel with a layer of particulate. The mandrel is then redipped into the solution to form a second layer over the particle layer, and the entire process may be repeated until a sufficiently thick glove is achieved. Misting ensures an even coating of the particulate matter and provides a means for concentrating the particulate in areas most likely to encounter a sharp instruments such as the palm and finger areas. The particulate adheres to the solution due to the tacky nature of the drying latex and additional dipping of the mandrel provides a coat for the particulate and prevents the particulate from being rubbed off.

Alternately, a glove may be prepared by mixing the particulate into a matrix solution directly and alternately dipping the mandrel into a straight matrix solution and solution/particulate mixture. This procedure preferably uses a mixture of approximately 1 part particulate to 3 parts matrix solution by volume. Wetting agents or solvents such as toluene are preferably used to disperse the particulate matter in the solution and promote mixing. A mandrel is first placed in the straight matrix solution to form a first layer, then dipped into the mixture, removed and allowed to cure, forming a second layer over the mandrel, and finally coating the mandrel with a third layer of straight matrix solution. This procedure is repeated if necessary to increase the thickness of the glove, with each successive "dip" added 1–2 mm of thickness to the glove and the resulting increase in degree of protection.

Figure 2:
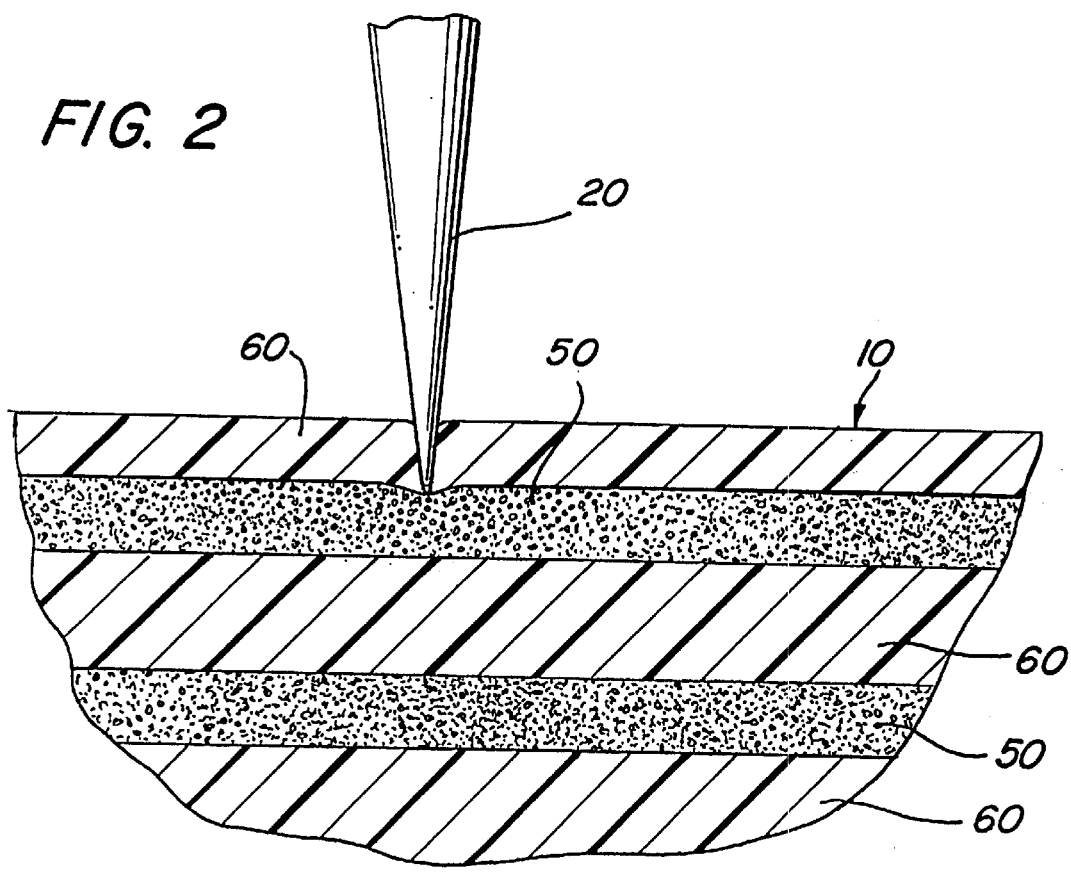
FIG. 2 is a magnified cross sectional view of the surgical glove of the present invention and a blade impinging said glove.

The finished glove 10 has a cross sectional shown in FIG. 2, with the approximate density of the particulate matter 40 illustrated therein. The glove will comprise at least one particulate layer 50 sandwiched by two layers of matrix material 60, and as shown the glove may have multiple layers of particulate matter 50. An enlarged view of a blade (or needle) 20 attempting to penetrate the glove is shown (not necessarily to scale) being repelled by the particulate layer 50. The particulate size is preferably between 5 and 8 microns, but may be between 1 and 85 microns. The compact density of the particulate matter provides the barrier to prevent penetration and the particle hardness repels intrusion into the composite. As can be seen, the density and dispersion of the particulate number avoid the need to "arrange" the particulate in a predetermined orientation, which can lead to weak spots and inconsistent protection. In the present invention, the particulate repels a foreign object by virtue of the hardness of the particulate, which forms an overlapping barrier of protection. Obviously, smaller particulate will increase the number of particulate while larger particulate will reduce this number. It can readily be seen that the tiniest particles yield the most tactility and elasticity, all other factors being equal. The compactness of the particulate also serve to disperse point of contact forces throughout adjacent areas which reduce the stress on the matrix and consequently the possibility of tearing the glove. The matrix may also be made from a hypoallergenic elastomer such as tachtylon reducing the possibility of an allergic reaction to latex or to rubber.

It will be understood that the embodiment described herein are merely exemplary and that a person skilled in the art may make many variations and modifications without departing from the spirit and scope of the invention. All such variations and modifications are intended to be included within the scope of the invention as defined in the appended claims.

What is claimed is:

1. A protective material suitable for surgical gloves comprising:

a polymeric material having the properties of a liquid when heated and which cures to an elastic solid when cooled, said elastic solid being impervious to liquids; and a layer of hard particulate matter having a value of at least 9 on the Mohs hardness scale sandwiched between the polymeric material.

2. A surgical glove comprising:

stretchable, air and liquid impenetrable polymeric material formed in the shape of a human hand from a liquid which is curable in air; and a compact layer of particulate powder dispersed in said polymeric material so as to be permanently incorporated therein, said particulate powder being a particulate comprising carborundum, diamond dust, or a combination thereof.

3. The surgical glove of claim 2 wherein the mean size of said particulate powder is between 5 and 50 microns.

4. The surgical glove of claim 2 wherein said particulate powder is carborundum.

5. The surgical glove of claim 2 wherein said particulate powder is diamond dust.

6. The protective material of claim 2 wherein the ratio of polymeric material to particulate powder by volume is 4 to 1.

7. The surgical glove of claim 2 further including an elastomer.

8. The surgical glove of claim 2 wherein said polymeric material is latex.

9. The surgical glove of claim 2 wherein said polymeric material is hypoallergenic.

10. The surgical glove of claim 2 wherein said polymeric material is tachtylon.

11. The surgical glove of claim 2 further comprising multiple layers each layer comprising particulate powder having a value of at least 9 on the Mohs hardness scale dispersed in the polymeric material.

* * * * *